(12) United States Patent
Bauer et al.

(10) Patent No.: US 11,941,145 B2
(45) Date of Patent: Mar. 26, 2024

(54) USER DATA SYSTEM INCLUDING USER DATA FRAGMENTS

(71) Applicant: Branch Metrics, Inc., Redwood City, CA (US)

(72) Inventors: Jonas Bauer, Atherton, CA (US); Dmitri Gaskin, San Carlos, CA (US); Eric J. Glover, Chappaqua, NY (US); Charles Gilliam, Seattle, WA (US)

(73) Assignee: Branch Metrics, Inc., Palo Alto, CA (US)

( * ) Notice: Subject to any disclaimer, the term of this patent is extended or adjusted under 35 U.S.C. 154(b) by 405 days.

(21) Appl. No.: 17/405,080

(22) Filed: Aug. 18, 2021

(65) Prior Publication Data
US 2022/0083686 A1 Mar. 17, 2022

Related U.S. Application Data
(60) Provisional application No. 63/067,606, filed on Aug. 19, 2020.

(51) Int. Cl.
G06F 21/62 (2013.01)
G06F 16/953 (2019.01)

(52) U.S. Cl.
CPC ........ *G06F 21/6245* (2013.01); *G06F 16/953* (2019.01)

(58) Field of Classification Search
CPC ............................ G06F 21/6245; G06F 16/953
See application file for complete search history.

(56) References Cited

U.S. PATENT DOCUMENTS

| | | | | |
|---|---|---|---|---|
| 5,956,400 A | * | 9/1999 | Chaum | ............... H04L 63/0428 707/999.009 |
| 2002/0010679 A1 | * | 1/2002 | Felsher | ............... G06F 21/6245 705/51 |

(Continued)

OTHER PUBLICATIONS

"Best practices for unique identifiers", pdf—archived on Aug. 14, 2020. Accessed on Jan. 12, 2022 at the website: https://web.archive.org/web/20200814142720/https://developer.android.com/training/articles/user-data-ids.

(Continued)

*Primary Examiner* — Michael Won
(74) *Attorney, Agent, or Firm* — RMCK Law Group PLC

(57) ABSTRACT

A method includes sequentially generating fragment records for a user device according to fragment generation rules specifying that each subsequent fragment record be generated for user device events that occur within a defined period of time. Each fragment record includes event data for a series of user device events and includes a fragment ID generated using a non-deterministic ID generation algorithm. The method includes generating an ID-fragment record associating a chain ID with the fragment IDs. The chain ID is associated with device IDs that identify the user device. The method includes removing associations between the chain ID and fragment IDs according to removal parameters indicating that associations be removed based on an age of the fragment records. The method includes generating at least one of search results and advertisements for the user device based on the event data in the fragment records that remain associated with the chain ID.

22 Claims, 5 Drawing Sheets

(56) References Cited

U.S. PATENT DOCUMENTS

| | | | |
|---|---|---|---|
| 2002/0083025 A1* | 6/2002 | Robarts | G06F 21/6245 |
| | | | 706/12 |
| 2005/0261938 A1* | 11/2005 | Silverbrook | G06Q 10/087 |
| | | | 705/2 |
| 2014/0095326 A1* | 4/2014 | Adam | G06Q 30/0273 |
| | | | 705/14.73 |
| 2016/0274744 A1* | 9/2016 | Neumann | H04N 21/47202 |
| 2017/0140219 A1* | 5/2017 | King | G06F 40/166 |
| 2017/0161439 A1* | 6/2017 | Raduchel | G16H 10/60 |
| 2022/0051113 A1* | 2/2022 | Kazlauskis | H04L 41/16 |
| 2022/0083686 A1* | 3/2022 | Bauer | G06F 16/953 |

OTHER PUBLICATIONS

"Mozilla to Apple", pdf—published on Apr. 17, 2019. Accessed on Jan. 12, 2022 at the website:https://nakedsecurity.sophos.com/2019/04/17/mozilla-to-apple-protect-user-privacy-with-rotating-phone-ids/.

* cited by examiner

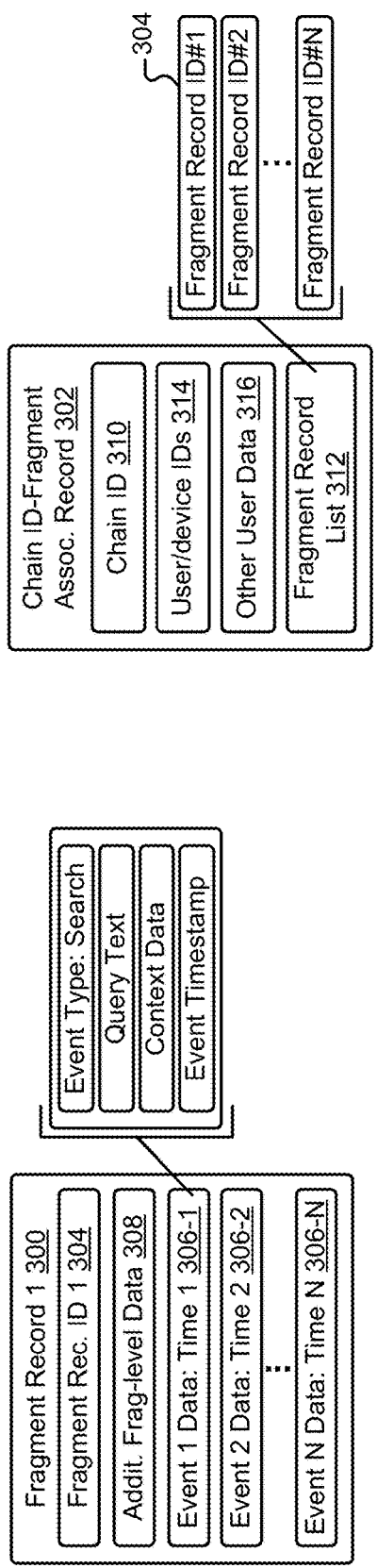
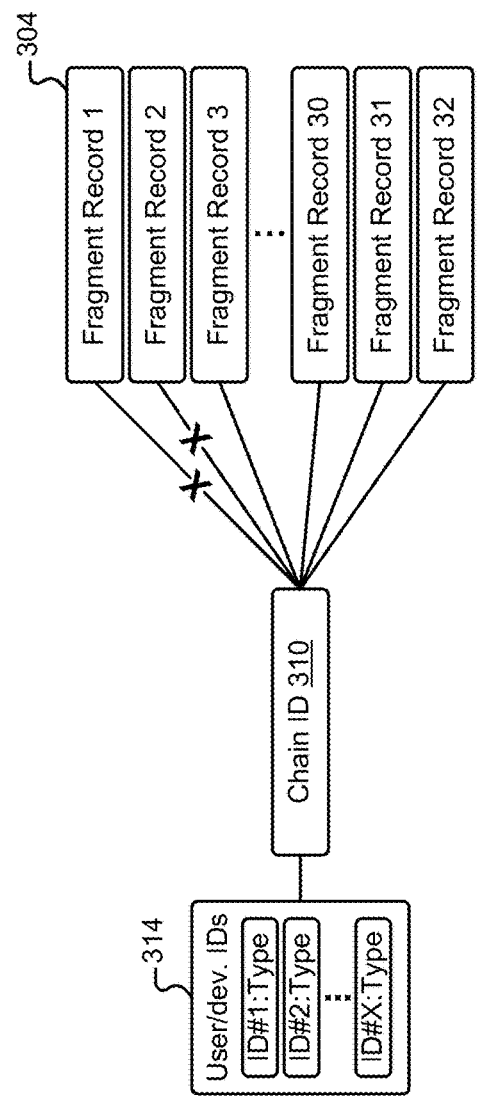
FIG. 3A
FIG. 3B
FIG. 3C

USER DATA SYSTEM INCLUDING USER DATA FRAGMENTS

CROSS-REFERENCE TO RELATED APPLICATIONS

This application claims the benefit of U.S. Provisional Application No. 63/067,606, filed on Aug. 19, 2020. The disclosure of the above application is incorporated herein by reference in its entirety.

FIELD

The present disclosure relates to a data storage system that provides privacy and security for stored data.

BACKGROUND

Software developers can develop websites and applications that are accessed by users on a variety of different platforms, such as different computing devices and operating systems. Example websites/applications may include e-commerce applications, media streaming applications, business review applications, social media applications, and news applications. In some cases, developers and other parties may acquire analytics regarding the acquisition and usage of their websites and applications so that they can gain a better understanding of how their application is acquired and used on the different platforms. The acquired analytics may be used to provide/enhance some services, such as search and advertisement services. When acquiring analytics data, developers and other parties may implement private and secure systems that are designed to safeguard data and user identify.

SUMMARY

In one example, a method comprises sequentially generating, at a server, a plurality of fragment records for a user device according to fragment generation rules. The fragment generation rules specify that each subsequent fragment record be generated for user device events that occur within a defined period of time. Each fragment record includes event data from the user device for a series of user device events associated with actions taken on the user device. Each fragment record includes a fragment identifier (ID) that uniquely identifies the fragment record and was generated using a non-deterministic ID generation algorithm. The method further comprises generating, at the server, an ID-fragment record that associates a chain ID with the plurality of fragment IDs. The chain ID is associated with one or more device IDs that identify the user device. The method further comprises removing, at the server, associations between the chain ID and fragment IDs according to removal parameters indicating that associations between the chain ID and fragment IDs be removed based on an age of the fragment records. The method further comprises generating, at the server, at least one of search results and advertisements for the user device based on the event data included in the fragment records that remain associated with the chain ID after removing associations between the chain ID and some fragment IDs.

In one example, a method comprises sequentially generating, at a server, a plurality of fragment records for a user device according to fragment generation rules. The fragment generation rules specify that each subsequent fragment record be generated for user device events that occur within a defined period of time. Each fragment record includes event data from the user device for a series of user device events associated with actions taken on the user device. Each fragment record includes a fragment identifier (ID) that uniquely identifies the fragment record and was generated using a non-deterministic ID generation algorithm. The method further comprises generating, at the server, an ID-fragment record that associates a chain ID with the plurality of fragment IDs. The chain ID is associated with one or more device IDs that identify the user device. The method further comprises removing, at the server, associations between the chain ID and fragment IDs according to removal parameters indicating that associations between the chain ID and fragment IDs be removed based on an age of the fragment records. The method further comprises attributing, at the server, a recent user device event in a first fragment record to a prior user device event in a second fragment record. The method further comprises, in response to attributing the recent user device event to the prior user device event, sending, from the server, routing data to the user device configured to access an application page.

BRIEF DESCRIPTION OF THE DRAWINGS

The present disclosure will become more fully understood from the detailed description and the accompanying drawings.

FIG. 3A illustrates an example fragment record.

FIG. 3B illustrates an example chain ID-fragment association record.

FIG. 3C graphically illustrates an example chain ID-fragment association record.

In the drawings, reference numbers may be reused to identify similar and/or identical elements.

DETAILED DESCRIPTION

Figure 1:
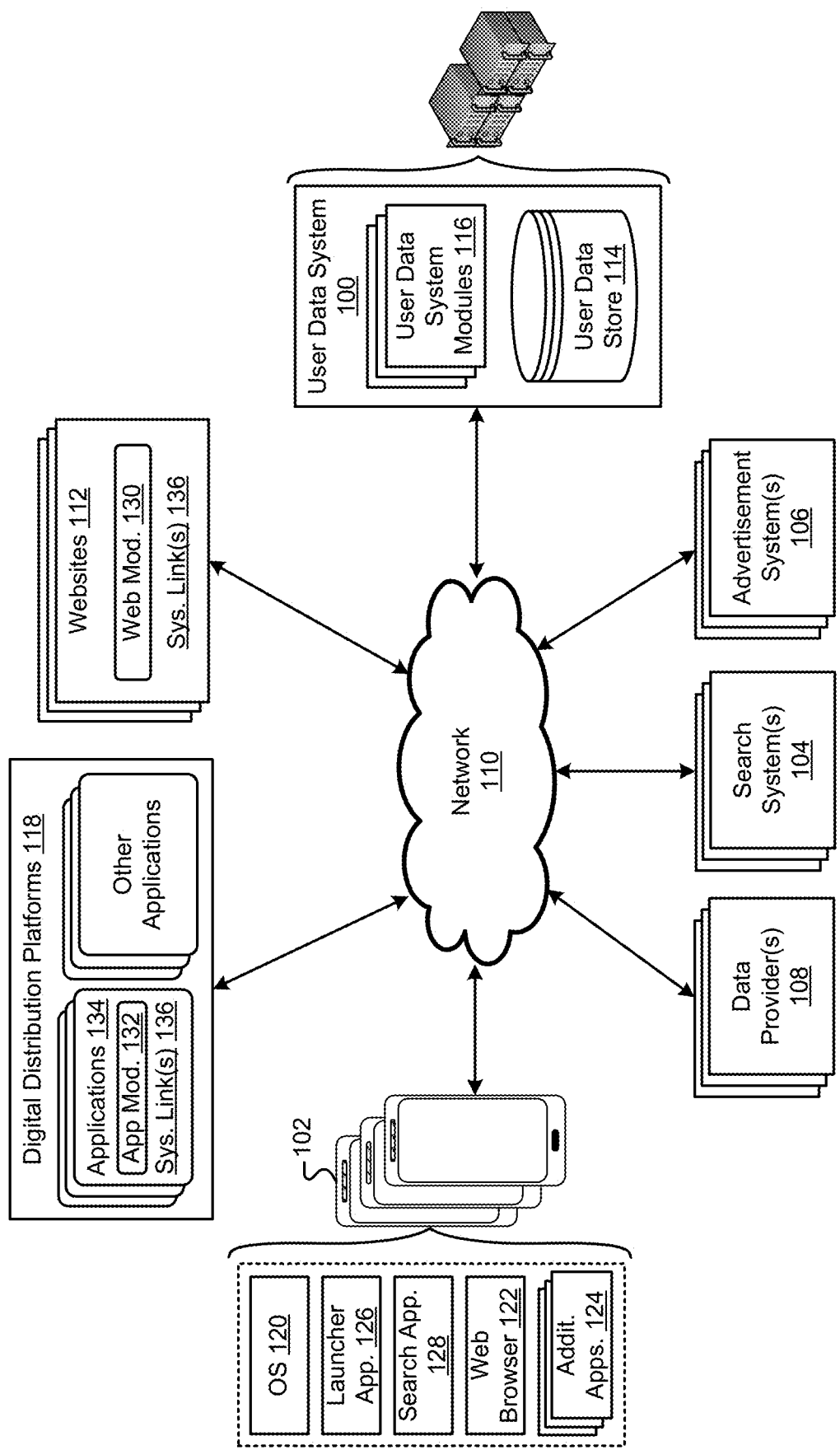
FIG. 1 illustrates an environment that includes an example user data system of the present disclosure.

FIG. 1 illustrates an example user data system 100 (hereinafter "data system 100") that may store and process a variety of types of data. For example, the data system 100 may store and/or process user data. In some implementations, the data system 100 may store/process event data associated with user actions taken on user devices. For example, event data may be generated in response to a variety of user events, such as search events (e.g., search request and result selection), advertising events (e.g., advertisement views/selections), launcher events (e.g., user gestures on a launcher application), application events (e.g., application installations/opens), and web events (e.g., webpage views).

Each event may include associated event data (e.g., event metadata) that is descriptive of the event. Example event metadata may include, but is not limited to: 1) an identifier that identifies the device/user associated with the event, 2)

an event type/descriptor that identifies and/or describes the type of the event, and 3) a timestamp indicating when the event occurred and/or was logged by the data system 100. Example event data may also include other data that is descriptive of the event and/or the context of the event, such as the source of the event (e.g., an application name), the geolocation of the event (e.g., a country), a device type associated with the event (e.g., a smartphone brand/name), an operating system, and other data. The event data fields and values may depend on the type of event.

Figure 2:
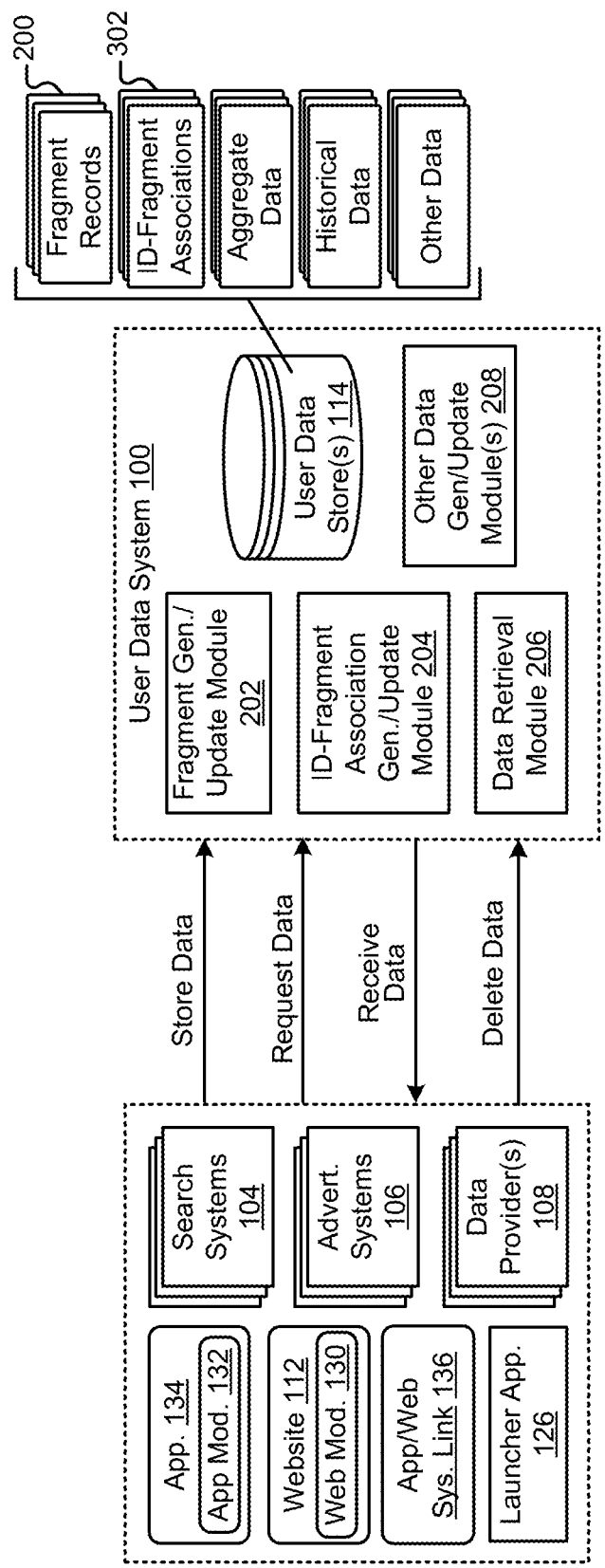
FIG. 2 illustrates an example user data system in communication with a plurality of systems and devices.

The data system 100 may store user data for a user (e.g., a user device 102) as a plurality of fragment records (i.e., "fragments"), such a fragment records 200, 300 of FIGS. 2-3A. Generation of fragment records may be controlled by fragment generation rules that indicate how user data should be stored in the fragment records. For example, fragment generation rules may indicate that fragment records should be generated based on the time that events occur.

In some implementations, if fragment generation rules indicate that the fragments be generated for defined periods of time, each of the fragment records may store user data that is received during a different defined period of time. For example, the data system 100 may generate a new fragment record for user data received each day. In a specific example, the data system 100 may generate an initial fragment record for a user upon receipt of the first user data received from the user. Subsequently, the data system 100 may continue to include received user data in the initial fragment record for a defined period of time (e.g., 1 day). After the defined period of time has passed, the data system 100 may generate a new fragment record that stores user data for the subsequent defined period of time. In this manner, the data system 100 may store a plurality of fragment records for a plurality of defined periods of time. Although fragment records may be generated for defined periods of time (e.g., sequential defined periods), the data system 100 may generate fragment records according to other fragment generation rules, such as rules that separate fragments by event type and/or event source. In some implementations, fragment generation rules may separate fragments based on a number of events included in the fragments and/or an amount of data included in the fragments. The fragment generation rules may also define fragments for any combination of factors described herein, such as event type and time period.

The data system 100 may generate a fragment record ID ("fragment ID") for each fragment record when the fragment record is generated. The data system 100 may generate the fragment ID in a non-deterministic manner (e.g., using a non-deterministic generation algorithm). For example, the data system 100 may generate a fragment ID in a random manner (e.g., as a random number/character string). The non-deterministic/random fragment ID generation may ensure that the fragment ID may not be used to recreate or otherwise reconnect the fragment ID/record back to one or more unique identifiers associated with the user or user device(s).

The data system 100 may generate a data system identifier for a user that associates one or more unique user/device identifiers to the fragments associated with the user. The data system identifier for associating the fragments for a single user may be referred to as a "chain identifier (ID)," as the chain ID may be used to identify a chain of fragment records that were generated over time. For example, the chain ID may be associated with each fragment ID of a sequential series of fragment records (e.g., a "chain" of fragment records). The data structure that associates a chain ID to one or more fragment records may be referred to herein as an "ID-fragment association record" (e.g., see FIGS. 3B-3C).

The chain ID may be a persistent identifier associated with one or more unique user/device identifiers. As described herein, a single user may use one or more user devices 102, each of which may be associated with one or more identifiers. A chain ID may be associated with identifiers from one or more user devices. In some scenarios, the data system 100 may generate a chain ID for each user device of a single user. Although a chain ID may be associated with identifiers from one or more user devices, the chain ID may be generally referred to herein as associated with a user.

In some implementations of the data system 100, the ID-fragment association record may be the only association that connects a user to each of their fragments. For example, since each fragment may be assigned a non-deterministic/random fragment ID, the fragments may not be associated to one another via the fragment IDs. Furthermore, the fragments may be structured such that the fragment data in the fragments may not be used to identify their association with other fragments or the user.

The data system 100 may disassociate a fragment from the chain ID in order to disassociate a fragment from the user (e.g., see FIG. 3C). For example, the data system 100 may disassociate a fragment from the chain ID by deleting the association in the ID-fragment association record. Once a fragment is disassociated, the fragment may not be associated back to the user or another fragment. Once a fragment is disassociated from the chain ID, the fragment may still be available for other processing/analytics by other systems.

The data system 100 may be configured to disassociate fragments from the chain ID in order to limit an amount of data in the data system 100 that is associated with a user. For example, the data system 100 may be configured to disassociate a fragment from the chain ID according to fragment retention/removal parameters/rules (e.g., a "fragment retention policy" or "retention policy"). In one example, the data system 100 may disassociate a fragment based on the age of the fragment. In a specific example, the data system 100 may disassociate a fragment if the fragment has been stored for greater than a threshold period of time (e.g., greater than 30 days). In this specific example, the data system 100 may store and access data for a user within the threshold period of time (e.g., 30 days), but may not access user-specific data that is older than the threshold period of time (e.g., older than 30 days). Although the retention policy may be based on an age of the fragments, other retention policy parameters may include, but are not limited to, a total number of fragments, a total number of events, and a total amount of data. Additionally, the retention policy parameters may be event type/source specific. For example, the retention policy may specify a total number of events for a specific type.

The data system 100 may allow and restrict data usage in a variety of ways described herein. For example, the data system 100 may allow for some amount of association/analysis between events for a user, such as events in the same fragment or between fragments connected in the chain. Once events in a fragment are removed from the chain, the events may not be associable back to the user and other fragments/events associated with the user. As such, the fragmentation of user data and the retention policy of ID-fragment associations may provide privacy and security for stored user data. For example, the fragmentation and retention policy may prevent the persistent long-term storage of data in a manner that allows the data to be tracked back to a user. Although the events in fragments that have been cut from the chain are not associable back to the user, the unassociated events may be processed individually and/or in aggregate with other fragments cut from the chain. Accordingly, the data system 100 described herein may store and control access to data associated with a specific user according to a retention policy (e.g., a retention period of 30 days), and then may only allow data to be processed in a non-user specific manner outside the bounds of the retention policy.

FIG. 1 illustrates an environment that includes user devices 102, search systems 104 (e.g., server computing devices), advertisement systems 106 (e.g., server computing devices), data providers 108, and a data system 100 in communication via a network 110. The network 110 may include various types of computer networks, such as a local area network (LAN), wide area network (WAN), and/or the Internet. The data system 100 may receive data (e.g., event data) from the user devices 102 (e.g., user device applications), websites 112 (e.g., web servers), data providers 108, search systems 104, and/or advertisement systems 106. The data system 100 may store and process the received data (e.g., received event data). The data system 100 may include one or more user data stores 114 (hereinafter "data store 114") that store the received data in fragment records. The data system 100 may include a plurality of data system modules 116 (e.g., see FIG. 2) that process the received and stored data.

Example user devices 102 may include, but are not limited to, a smartphone, laptop, tablet, desktop, and wearable computing devices. Other example user devices 102 may include smart assistant devices (e.g., smart speaker devices) and appliances. Example smart speaker devices may include, but are not limited to, an AMAZON ECHO® smart speaker by Amazon.com, Inc., a GOOGLE HOME® smart speaker by Google, Inc., or an Apple HOMEPOD® smart speaker by Apple, Inc.

A search system 104 may receive search requests including search queries from the user devices 102. The search system 104 processes the search queries, performs one or more searches, and outputs search results that include links to application states (pages) and/or websites. The application states (e.g., for installed applications) and/or websites may be associated with entities and actions that resolve the user's search query. The search system 104 may generate the search results (e.g., identify and score results) based on user event data and/or aggregate event data described herein.

The environment includes one or more digital distribution platforms 118. The digital distribution platforms 118 may represent computing systems that are configured to distribute applications to user devices 102. Example digital distribution platforms 118 include, but are not limited to, the GOOGLE PLAY® digital distribution platform by Google, Inc. and the APP STORE® digital distribution platform by Apple, Inc. Users may download the applications from the digital distribution platforms 118 and install the applications on user devices 102.

The environment includes a plurality of web servers that may serve websites 112 (or web applications) to the user devices 102. The environment may include an advertisement system 106 that generates advertisements for the search systems 104, websites 112, and/or applications installed on the user device 102. The advertisement system 106 may generate the advertisements (e.g., identify and score advertisements) based on user event data and/or aggregate event data described herein.

A user device 102 includes an operating system 120 and a plurality of applications, such as a web browser application 122 and additional applications 124. Example additional applications may include, but are not limited to, e-commerce applications, social media applications, business review applications, banking applications, gaming applications, and weather forecast applications. Using the web browser 122, the user device 102 can access various websites 112 via the network 110. The user device 102 may also include a launcher application 126 that runs on the user device 102 to help the user find and launch other applications and user device functionality (e.g., search functionality).

The user device 102 includes a search application 128 that may operate locally on the user device 102 and/or communicate with the search system 104 to generate search results. For example, the search application 128 can receive a user's search query and make a search request to the search system 104. The search application 128 can receive and display search results received from the search system 104. In some implementations, the search application 128 can acquire context data to include in the search request. Context data may include a variety of types of data, such as a user ID, operating system information, device type information, geolocation data, time of day, query history data (e.g., one or more prior queries in the search application 128), application usage data, user state of motion data (e.g., walking, biking, driving), user-historical context (e.g., all of the above historically), and/or category of the query (e.g., selected in the GUI).

The environment includes one or more data providers 108. The data providers 108 may represent computing systems that provide event data ("external event data") to the data system 100. In some implementations, the data providers 108 may be businesses that provide data management and analytics services. The data providers 108 may collect data regarding how users are using the search system 104, advertisement system 106, applications, and websites 112.

In some implementations, one or more data providers 108 may provide a web module 130 to websites 112. The web module 130 may include software libraries and functions/methods that may be included in the websites 112. The web module 130 may be configured to report web events to the data providers 108 and/or data system 100. In some implementations, one or more data providers may provide an application module 132 to application developers. The application module 132 may include software libraries and functions/methods that may be included in an application 134. The application module 132 may be configured to report application events to the data providers 108 and/or the data system 100.

In some implementations, a data provider 108 may also provide system links 136 (e.g., web URL redirect links) that report their selection to the data provider's system 108 and/or data system 100 as link selection events. Example system links 136 may include hyperlinks, GUI buttons, graphical banners, or graphical overlays. In response to selection of a system link 136, a data provider system 108 and/or data system 100 may log the selection and/or provide a response to the user device 102.

Referring to FIG. 2, the data system 100 may receive data (e.g., event data) from a variety of sources. Example sources may include, but are not limited to: 1) search systems 104, 2) advertisement systems 106, 3) data providers 108, 4) user devices 102 (e.g., applications), and 5) websites 112. The variety of sources may also request data from the data system 100.

The data system 100 may receive a variety of types of data (e.g., event data). Example data described herein may include event data that indicates a user action taken on the user device 102. Event data described herein may be named according to the source/type of the event data. Example event data types may include, but are not limited to: 1) search system event data ("search event data"), 2) advertisement event data ("ad event data"), 3) application event data ("app event data"), 4) website event data ("web event data"), 5) launcher event data, 6) link event data, and 7) data provider event data (e.g., collections of the above types). Note that some data may be labeled as one or more types. For example, a search application event may be labeled as application event data and/or search event data. As another example, a search via a website may be labeled as web event data and/or search event data.

Event data may include device identifiers ("device IDs") that identify the user device that generated the event data. Some device IDs may be associated with a web browser on a user device (e.g., set by a web browser). Device IDs associated with the web browser may be referred to herein as "web IDs." Example web IDs may include browser cookie IDs, which may be referred to as web cookies, internet cookies, or Hypertext Transfer Protocol (HTTP) cookies. Some device IDs may be associated with applications installed on the user device other than the web browser. In some cases, the device IDs may be operating system generated IDs that installed applications may access. Additional example device IDs may include advertising IDs (e.g., a Google Advertising ID—GAID), which may vary depending on the operating system (OS) on the user device. In some implementations, applications may generate their own IDs that are application specific (e.g., a search application ID).

Event data may also include other data associated with the device, such as an Internet Protocol (IP) address of the user device, OS name, OS version, device type, screen resolution, and other user identification data (e.g., a username, user agent data, etc.). As described herein, the data system 100 may generate a chain ID for a user that may be associated with one or more of the device IDs. The chain ID may also be associated with other user data, such as the other device data that may identify the user device (e.g., IP address) (e.g., see FIG. 3B). In general, the data system 100 may not store data in the fragment records that may be used to identify the user/device, such as the chain ID, device IDs, or other device data (e.g., IP address or username).

Search event data may include any data associated with the local search application 128 and/or remote search system 104. The search event data may include data associated with search requests, such as the search query, search context data, and autosuggest/autocomplete data. The search event data may also include data associated with the search results, such as the application/web uniform resource indicators/locators (URIs/URLs) associated with the results, relevance scores associated with the results, and ranking of the results. The search event data may also include user interaction data associated with the search results, such as data that indicates which results were viewed and/or selected.

Ad event data may include any data associated with locally stored/generated advertisements and/or advertisements generated by a remote advertisement system 106. For example, ad event data may include the parameters used to select advertisements, such as search request data, search result data, and search context data. The ad event data may also include ad parameter data associated with the advertisements, such as ad targeting parameters, bid price, and other ad identification/scoring parameters. The ad event data may also include ad impression data (e.g., ad views) and ad selection data (e.g., advertisements that are touched/clicked). In some cases, ad event data may include ad performance data that indicates if an ad performed successfully, such as whether the ad was selected and/or whether a user installed an application and/or made a purchase as a result of the advertisement.

App event data may include any data that indicates how a user interacts with an application. Example app event data may include app installation data, app uninstallation data, app open data (e.g., when an application is opened), application close data (e.g., when an application is closed), app page view data indicating which application state/page was viewed (e.g., a deeplink URI/URL), app commerce event data (e.g., adding an item to a cart, purchasing an item, and/or starting a subscription), and other custom events/data defined by the application developer. In some cases, a commerce event may indicate specific data regarding the transaction, such as which items were added to a cart, the stock keeping unit (SKU) of the item(s), a total value of the cart, etc.

In some cases, the app event data may include an application name/ID that indicates the application with which the app event data is associated and an event identifier that indicates the type of event (e.g., app open, close, etc.). In some implementations, the event data may include attribution data that indicates a prior event, or plurality of events, that led up to (e.g., caused) the current event. For example, in some implementations, the event data may indicate whether the event was triggered by selection of an advertisement, as well as the advertisement provider/partner name and/or deeplink URI/URL.

Web event data may include any data that indicates how a user interacts with websites 112 using the web browser 122. Example web event data may include webpage view event data (e.g., a URL, time, etc.), session data, web commerce event data (e.g., adding an item to a shopping cart and or purchasing), and other custom web events/data defined by the website developer. The web event data may include a website name/ID, URL (e.g., current/referring pages), and an event identifier that indicates the type of web event (e.g., page view, commerce event, etc.).

Launcher event data may include any data that indicates how a user interacts with a launcher application 126. For example, launcher event data may indicate launcher GUI interactions, such as user gestures (e.g., swipes). The launcher event data may also indicate user views and interactions with different launcher screens, such as the home screen and other functional screens/panels (e.g., settings, WiFi, flashlight, etc.). The launcher event data may also indicate which applications were selected by the user. Launcher event data may also include data associated with device operation, such as an internet connection and/or battery status.

Link event data may indicate which system links 136 were selected and the locations (e.g., URIs/URLs) of the system link selected. Link event data may also include data associated with the links, such as the data accessed by the link (e.g., shared content). Data provider event data may include any data acquired by the data provider systems 108. Different data providers may acquire and process data from different sources. As such, data providers may provide any of the event data described herein (e.g., search data, ad data, app data, etc.).

The following data structure is an example event data structure associated with a new subscription on the Music App application: Event_context {timestamp: 1627320729, geo_country: US, device_type: Samsung Galaxy S10}, Event_metadata {event_type:NEW SUBSCRIPTION, subscription_term: 12_MONTHS, subscription_amount: 10.99, subscription_amount_currency: USD}, Source_metadata {source_platform: MOBILE APP, source_company: Music App, came_from_ad: YES, ad_partner_name: BRANCH, deeplink_id: 123456}. The event data structure includes example data fields for event context data, event metadata, and source metadata. The Event_context_data indicates the timestamp associated with the event, the geolocation of the event (e.g., US), and the device type for the event (e.g., Samsung Galaxy S10). The Event_metadata field indicates that the event was a new subscription for 12 months at the cost of $10.99 USD per month. The Source_metadata field indicates that the event was generated by a mobile application (e.g., the Music App application) in response to selection of an advertisement. In this case, the advertisement partner was the company BRANCH (e.g., Branch Metrics, Inc.). The deeplink_id associated with the event is 123456.

The data system 100 may be used by other devices/systems of FIGS. 1-2 for a variety of purposes. For example, other systems/devices may store data (e.g., event data) in the data system 100 and read data from the data system 100. The other systems/devices may also retrieve aggregate data from the data system 100.

In some implementations, the data system 100 can track events (e.g., app/web events) that occur on user devices over time. The data system 100 can also attribute the occurrence of some events to prior events (e.g., see FIG. 5). For example, the data system 100 may attribute the installation of an application to a prior user selection of a link, such as a hyperlink on a webpage or a banner advertisement. As another example, the data system 100 may attribute the purchase of an item on a website and/or application to a previously selected link. The attribution functionality provided by the data system 100 can be useful to a variety of parties, such as businesses, advertisers, and application developers that may wish to monitor performance of their applications/websites. Additionally, the attribution functionality provided by the data system 100 may also be used to provide various functionality to user devices 102, such as routing a user device into an application state in response to user selection of a web link.

In some cases, the data system 100 can leverage data to provide responses to a user device 102 based on past events generated by the user device 102. For example, if a user selects a link for accessing content in an application that the user device does not have installed, the data system 100 can log the selection of the link and can redirect the user to download/install the application. Upon opening the newly installed application, the application can transmit an event to the data system 100. The data system 100 may match the two events and, based on the match, the data system 100 can direct (e.g., route) the opened application to the content linked to by the previously selected link. In some cases, directing an opened application (e.g., a newly installed application) to a previously selected link may be referred to as "deferred deep linking."

A search system 104 may use data acquired from the data system 100 in a variety of ways. In some implementations, the search system 104 may use aggregate data to improve search algorithms, such as query processing, result identification, and result scoring/ranking. In some implementations, the search system 100 may personalize search for the user by using previous search events and other events associated with the user. In some implementations, aggregate event data may be used as scoring features for search results. In some implementations, the search system 104 may generate results (e.g., score/filter results) based on the installation status of applications. For example, the search system 104 may filter out (e.g., remove) or penalize links to applications that are not installed. As another example, the search system 104 may boost results for applications that are installed.

In some implementations, the search system 104 may score/filter results based on the user's application usage (e.g., one or more application usage values). For example, the search system 104 may score/filter based on the amount an application is used, such as the frequency of usage or total usage. In this example, results associated with higher application usage may be boosted. In some implementations, the search system 104 may score/filter results based on the recency of application usage. For example, results for more recently used applications may be scored higher. In this example, results associated with applications that have not been used in a period of time may be filtered out.

Additional search personalization may be based on personalized usage patterns, such as the day of the week applications are used and/or the time of day the applications are used. In this example, the search system 104 may boost results that are associated with applications the user uses at the current time of day or day of week. Additional personalization can be based on application installation status and usage by device type (e.g., laptop, smartphone, etc.). For example, the search system 104 may score/filter results based on user historical application usage by device. In some implementations, the search application 128 may use data acquired from the data system 100 in a similar manner as the search system 104. Other applications may also use data from the data system 100. For example, the launcher application 126 (or other application) may generate a content feed (e.g., relevant content URI/URL links) for the user based on the user's interests, as determined based on event data from the data system 100.

An advertisement system 106 may use data acquired from the data system 100 in a variety of ways. In some implementations, the advertisement system 106 may use aggregate ads data (e.g., advertisement popularity/performance) to improve advertisement algorithms (e.g., ad selection/scoring algorithms) and advertisement data. In some implementations, the advertisement system 106 (or local advertisement functionality) may personalize advertisements based on application installation and/or usage data described herein.

In some implementations, the user data system 100 may be accessed in an 'offline' mode/manner. For example, the user data system 100 may be accessed in an offline manner for the purposes of analysis, such as generating analytics graphs or metrics for human review.

Figure 4:
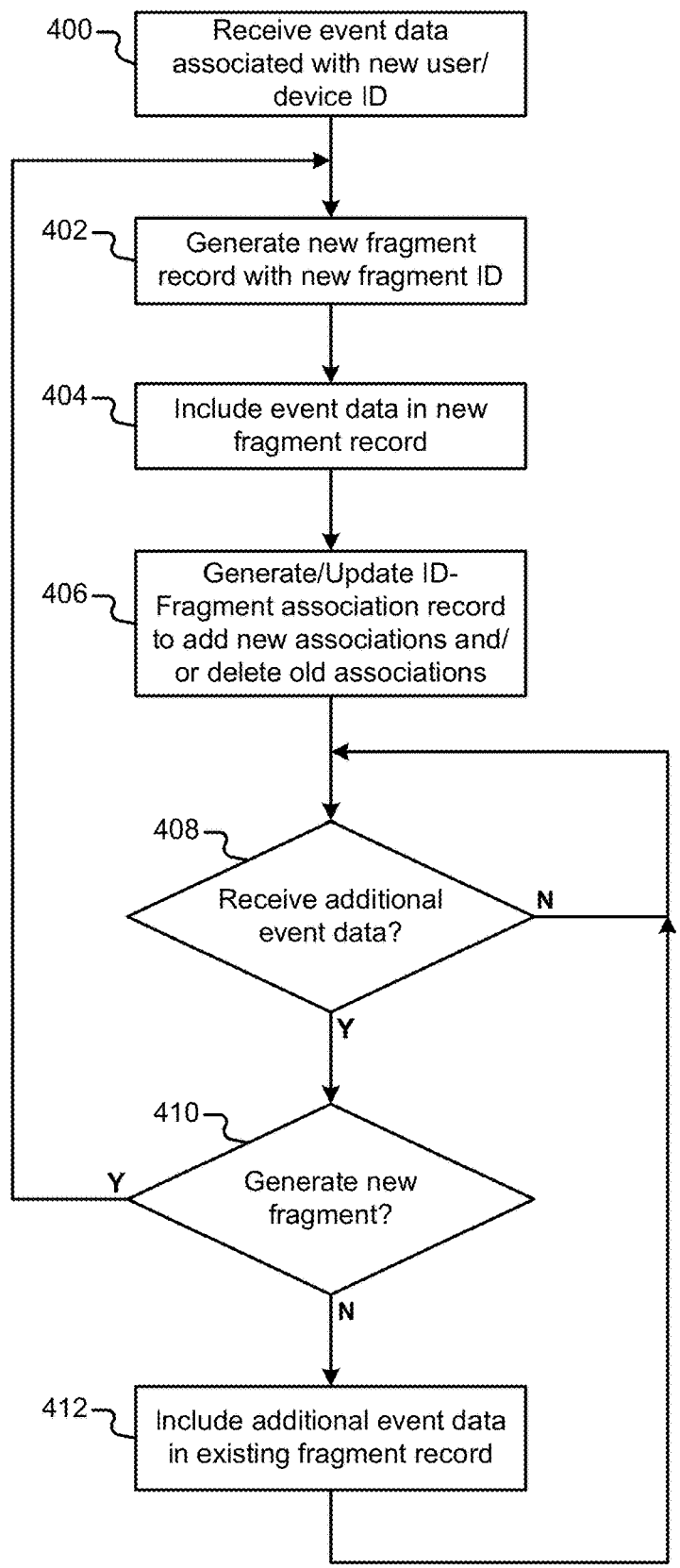
FIG. 4 is a method that describes generation of fragment records and ID-fragment association records.

FIGS. 3A-3C illustrate example data structures that may be stored by the data system 100 (e.g., in the user data store 114). FIG. 3A illustrates an example fragment record 300. FIGS. 3B-3C illustrate an example chain ID-fragment association record 302. FIG. 4 is a method that describes generation of fragment records and ID-fragment association records. The fragment records and other data structures illustrated herein may be physically collocated with each other in some implementations. For example, data in a fragment may be stored as a distinct record, such as a record in a database, file, or other system. In some implementations, the fragment records and other data structures illustrated herein may not be collocated with each other.

The fragment record 300 includes a fragment record ID 304 and associated data. For example, the fragment 300 may include data (e.g., event data) over a period of time (e.g., a predefined period of time). The example fragment record 300 of FIG. 3A includes data associated with N events

306-1, 306-2, . . . , 306-N. The fragment may also include fragment-level data 308. The data system 100 may include a fragment generation/update module 202 that generates, updates, and deletes the fragments, as described herein.

The fragment record ID 304 may uniquely identify the fragment record 300 among other fragments in the data system 100. The data system 100 (e.g., fragment gen/update module 202) may generate the fragment ID 304 in a non-deterministic manner (e.g., randomly). As described herein, the fragment ID 304 may have a limited boundary of event association. For example, the fragment ID 304 may associate some limited set of events to one another, depending on the fragment generation rules. In a specific example, the fragment ID 304 may associate a limited set of events within a specific time period and/or from a specific source. The fragment ID 304-1 may also associate the limited set of events back to the chain (i.e., chain ID), the extent of which may be defined by the retention policy.

The event data included in the fragment 300 may include any of the event data described herein. In some implementations, the data system 100 may implement some restrictions on the data that may be included in a fragment. For example, a fragment may be configured such that it does not include user/device IDs, or other data that may allow for determination of any user/device ID associated with a user. Each event may be associated with a timestamp that indicates when the event occurred and/or when the event was received by the data system 100. The example event 1 data 306-1 illustrated in FIG. 3A is a search request event that includes a search query and some additional context data. The event 1 data in FIG. 3A is only example event data. As such, additional/alternative event data described herein may be associated with events stored in fragments.

The fragments may store additional fragment-level data 308 ("additional fragment data"). The additional fragment data 308 included in fragments may be configurable and may include any type of data described herein. Example additional fragment data may include fragment timing data. The timing data may indicate when the fragment was generated. The timing data may also indicate when the data system 100 stopped adding to the fragment (e.g., a fragment ending time). In some implementations, the timing data may also indicate when the fragment was disassociated from the chain ID. In some implementations, the additional data may also include information about the user from the time period the fragment covers, such as user's interests (e.g., types of businesses, movies, music, etc.) and/or a user cohort (e.g., a Samsung phone cohort). In some cases, such additional data (e.g., user properties) may not correspond to any discrete kind of event or action.

A fragment record may store events for a user in a variety of ways, depending on fragment generation rules. In some implementations, the fragment record may store events for a user over a specified period of time (e.g., one day). For example, the data system 100 may be configured to store one day of events for a user ID in a fragment record. The data system 100 may generate a new fragment record for subsequent events that are outside of the period of time associated with a current fragment record. For example, in the case the data system 100 is configured to generate a fragment record for a single day of event data, the data system 100 may generate a new fragment record for each new day (e.g., each day event data is received). In this example, if the data system 100 receives events each day for a user, the data system 100 may generate a new fragment record for each day of events. For example, 30 days of events may be stored in 30 separate daily fragment records. Although a fragment record may include one day of events, in other implementations, a fragment record may be configured to store more or less than one day of events.

As described herein, although fragment records may be generated for defined periods of time, the data system 100 may generate fragment records according to one or more other fragment generation rules, such as fragment generation rules that specify fragments be generated by event type, event source, a number of events, an amount of data, an amount of personal data, an amount of specific types of data, and/or other parameter. In one example, separate fragments may be defined that include all app events and all web events on a daily basis. In this example, first and second fragments may store all app events and all web events, respectively, for a first day. Furthermore, third and fourth fragments may store all app events and all web events, respectively, for a second day.

Other additional fragment-level data may be calculated based on the events stored in the fragment. For example, additional fragment-level data may include, but is not limited to, 1) a timestamp indicating the most recent usage of an app/website, 2) a timestamp indicating the last time an app/website was accessed on a mobile device, 3) a timestamp indicating the last time an app/website was accessed on a desktop device, 4) activity data that indicates how often and when an app/website was used over a period of time in the fragment, 5) activity data that indicates how often an app/website was used on a mobile device in the fragment, and 6) activity data that indicates how often an app/website was used on a desktop device.

FIGS. 3B-3C illustrate an example chain ID-fragment association record 302 ("ID-fragment record 302") that associates a chain ID 310 with a plurality of fragment records 312 (e.g., a fragment record list 312). For example, for each new fragment record, the data system 100 may generate an association between the new fragment record and the chain ID 310 in the ID-fragment record 302. The chain of fragment data for an individual user may indicate how a user uses one or more user devices over time. For example, the chain of fragment data may indicate how a user uses the search systems 104, advertisement systems 106, applications, and a web browser 122 on one or more user devices over time. The data system 100 may include an ID-fragment association generation/update module 204 that generates ID-fragment records for users, makes associations, disassociates fragments, and performs other ID-fragment record operations described herein. In some implementations, the fragment and ID-fragment records may be represented as separate records in a database. In other implementations, the ID-fragment records may be represented as a single record (e.g., by having the fragment records be a property of the association record itself).

The data system 100 (e.g., the ID-fragment association gen/update module 204) may generate a chain ID for each user. In some implementations, the chain ID may be generated in a non-deterministic/random manner. Although a data system generated chain ID may be used, any of the other user/device IDs 314 may be used instead of a chain ID. In some cases, there may be multiple chain IDs/records for a single user. Such a scenario may occur if the user has multiple devices. Such a scenario may also occur if a user stops engaging with the service and no events occur for some period of time, and then the user starts engaging with the service again. In this case, the data system 100 may choose to create a new chain record rather than continuing to use a past one.

The chain ID 310 may be associated with one or more of the user/device IDs 314 described herein (e.g., advertising ID, web ID, etc.). Each of the identifiers associated with the chain ID 310 may include the identifier along with an associated identifier type. For example, for an advertising ID, the ID-fragment record may include the advertising ID as well as an identifier indicating that the advertising ID is of type "advertising ID" (e.g., see FIG. 3C). As described herein, in some implementations, fragment IDs may not be generated based on the user ID, or in any other way that may allow for connection between the fragment IDs and the chain ID. Accordingly, in some implementations, the ID-fragment record 302 may be the only data structure that associates a chain ID 310 (and other user/device IDs 314) and a fragment.

In some cases, the ID-fragment record 302 may also contain other additional data about the user or other additional context associated with the user (e.g., other user data 316 in FIG. 3B). Example additional data may include, but is not limited to, a last known IP address, last seen geo, and/or device information.

FIG. 3C graphically illustrates an ID-fragment record 302. In FIG. 3C, the chain ID 310 is associated with a plurality of fragment records 1-32. For example, if the data system 100 receives event data from a single user each day, and a new fragment record is generated for each day, the ID-fragment record may add an association between the chain ID and a single fragment record for each new day. Thirty-two fragment records are illustrated in FIG. 3C. The thirty-two fragment records may have been generated for thirty-two consecutive days of event data.

The data system 100 may be configured to remove associations between chain IDs and fragment records over time. For example, the data system 100 may store/remove associations between fragment records and chain IDs according to retention/removal parameters (e.g., a "retention policy") that indicate parameters for removing associations. In some implementations, the retention policy may indicate a period of time for retaining associations. In a specific example, the retention policy may indicate that the associations be retained for 30 days. In this case, the association between a fragment and a chain ID may be removed from the ID-fragment record after the association has been retained for 30 days. FIG. 3C illustrates an example case where fragment records are generated each day and the associations are retained for 30 days. For example, fragment records 1-2 have their associations removed/deleted (e.g., the "X" cuts the association) because the fragment records were over 30 days old. Additional retention/removal policies at the chain level may include a total amount of data, an amount of personal information, or other reason the data system 100 may use to determine that it may no longer be useful to retain the fragment association (e.g., lack of valuable data in the fragment).

In some implementations, disassociations from a fragment record may not result in the deletion of the fragment record. Instead, the fragment record may be retained. Since the fragment ID may not be traceable back to the chain ID after disassociation, the data system 100 may not determine which chain ID previously corresponded to the disassociated fragment record. The data system 100 may use the data included in the fragment record for other calculations moving forward after disassociation, such as data processing calculations described herein.

FIG. 4 illustrates an example method that describes operation of the data system 100. In block 400, the data system 100 receives event data associated with a new user device (e.g., new user/device ID). In block 402, the data system 100 generates a new fragment record with a new fragment ID. In block 404, the data system 100 includes the event data in the new fragment record. In block 406, the data system 100 generates a new ID-fragment record for the new fragment. The new ID-fragment record may include a new chain ID and a new association with the new fragment record.

In block 408, the data system 100 may wait to receive additional event data. If additional event data is received, in block 410, the data system 100 determines whether to generate a new fragment for the additional event data in block 402 or include the additional event data into the existing fragment record in block 412. The data system 100 may be configured to start/end the fragments based on fragment start/end parameters (e.g., according to fragment generation rules). Example start/end parameters may be based on time, fragment content, and/or other parameters. For example, a fragment may end based on the age of the fragment, the content included in the fragment (e.g., a data size of the fragment), or other factors. The data system 100 may start/end fragments according to any combination of start/end parameters.

In some implementations, the data system 100 may implement a global setting for the start/end of fragments. For example, the data system 100 may generate new fragments and end the fragments according to a global clock. In some implementations, the data system 100 may determine a start/end for fragments based on other timings, such as the timings generated by the user devices 102 (e.g., on a per user basis). Additionally, when the start/end of fragments are determined based on time, the data system 100 may use different time durations for fragments for different users.

In some implementations, the data system 100 may start/end fragments based on the amount of content associated with the fragments. For example, the data system 100 may end a fragment based on a number of events (e.g., a threshold number of events) and/or an amount of content (e.g., data size of the fragment). In some implementations, the data system 100 may start/end fragments based on a specific type of event or sequence of events (e.g., to preserve privacy). In some implementations, the data system 100 may start/end fragments based on the amount of potentially identifying data in the fragment. For example, the data system 100 may implement a policy/heuristic that determines when the fragment includes enough data that it could potentially identify a user uniquely, in which case the data system 100 forces the fragment to be split. In some implementations, the data system 100 may start/end fragments based on other techniques that determine a logical point to start a new record, such as by using a rolling window (e.g., if no new event has been received in N hours, start a new fragment).

If the data system 100 determines that a new fragment should be generated in block 410, the data system 100 generates a new fragment with a new fragment ID and data in blocks 402-404. In block 406, the data system 100 updates the ID-fragment record to include a new association with a new fragment record. The data system 100 may also determine whether to disassociate any older fragment records (e.g., based on a configured retention policy). The data system 100 may then continue generating fragments, generating associations, and disassociating fragment records according to the method of FIG. 4. Although the generation/update of the ID-fragment record is illustrated as being determined after generation of a new fragment record, the generation and updating (e.g., addition/removal of associations) of the ID-fragment record may occur as a separate process at any time.

Devices/systems that are external to the data system 100 may make requests for data from the data system 100 in a variety of ways. The data system 100 may include a data retrieval module 206 that retrieves data from the user data store 114. In some cases, the external devices/systems may request data based on a user/device ID. In these cases, the data system 100 may provide the requested data by retrieving data from fragments associated with the correct chain ID. In some implementations, the data system 100 may provide the data from the fragments, which may include the fragment IDs. In other implementations, the data system 100 may group the data associated with the chain ID into a single data file and provide the single file to the requesting device/system.

In some implementations, external devices/systems may request data directly using the fragment ID. This may occur when some fragment data is stored at a separate location (e.g., a separate log). For example, a separate event log data structure may be stored for separate services, such as for search services and/or analytic services.

After disassociation from a chain ID, the fragment data may not be accessible using a user/device ID. Note that disassociation from a chain ID may not result in deletion of the fragment record. As such, the fragment record may be stored for future processing after disassociation. The fragments that are disassociated may be referred to as historical fragments.

In some implementations, a user or plurality of users (e.g., an organization/business) may request deletion of their data from the data system 100. In response to a deletion request, the data system 100 may disassociate and/or delete one or more fragments. For example, the data system 100 may disassociate and/or delete specific fragments in response to the request. In other examples, the data system 100 may disassociate all fragments from a chain ID and/or delete a chain ID, but maintain the fragment records for future processing (e.g., in aggregate). In other examples, the data system 100 may delete all data associated with the user(s) by deleting the ID-fragment record and all associated fragment records.

The data system 100 may perform aggregate processing on data included in the data store 114. For example, the data system 100 may determine aggregate values associated with a plurality of currently associated fragment records and/or disassociated fragment records (e.g., historical fragments). In some implementations, the data system 100 may delete fragments after performing the aggregate processing. The data system 100 may include other data generation/update modules 208 that perform the aggregate processing.

The data system 100 may perform aggregate processing for analytics in some cases. For example, the data system 100 may determine analytics for internal usage and/or for partners, such as partner search system providers, partner advertisement system providers, and partner application developers. The partners may use the analytics to determine how their systems/applications are performing.

The data system 100 may also perform aggregate processing to determine values that may be used by the various devices/systems. For example, the data system 100 may determine aggregate values that may be used by the search system 104 and/or advertisement system 106, as described herein. Any of the event data may be used to generate aggregate data. For example, the data system 100 may generate aggregate search data for a plurality of users, aggregate advertising data for a plurality of users, aggregate app data, aggregate web data, etc.

Example aggregate app event data may include aggregate app usage data that indicates a number of users of the application over time. Example aggregate app usage data may include, but is not limited to, the number of daily active users (DAU) for the application and the number of monthly active users (MAU) for the application. The aggregate app usage data may also include the number of app events over time for a plurality of users. For example, aggregate app usage data may include the number of application opens over time, the number of different application states accessed over time, and the number of purchase events over time.

The aggregate app event data can be calculated for different geolocations, such as cities, states, and/or countries. For example, the aggregate app usage data may indicate the DAU for different countries. The aggregate app event data can also be calculated for different languages, different device types (e.g., smartphone type, laptop, desktop), different operating systems, different times of the day, and days of the week. The aggregate app event data can be calculated according to any combination of the parameters described herein. For example, the aggregate app event data may include a DAU count for a set of specific devices in a specific country.

In some implementations, the data system 100 may generate aggregate web event data that indicates a number of web events over a period of time, such as a number of times a domain/page was accessed. The aggregate web event data can be calculated for different geolocations, countries, languages, device types, operating systems, times of the day, and days of the week. The aggregate web event data can be calculated according to any combination of the parameters described herein.

In some implementations, the data system 100 may determine popularity scores using aggregate event data, such as aggregate event data indicating the number of times an entity (e.g., application state or webpage) was accessed. For example, the data system 100 may determine the popularity score based on the number of events associated with the application link to the entity relative to other application links associated with other entities. The aggregate event data described herein is only example aggregate data. As such, the data system 100 may generate additional/alternative aggregate data other than the aggregate data described herein.

In some implementations, the data system 100 may perform post-processing of specific in-fragment data after a fragment has been disassociated from the chain ID. For example, the data system 100 may learn some short term user behaviors (e.g., 1 day of associated events) based on in-fragment processing of disassociated fragments. In one example, for a single fragment (e.g., 1 day of events), the data system 100 may determine specific queries that later resulted in selection of specific applications. Based on this example in-fragment analysis for multiple fragments, the data system 100 may determine that specific queries may result in subsequent selection of a specific application if multiple separate fragment records frequently indicate the association between entry of the specific query and subsequent selection of the application (e.g., an app open and/or specific app result). In a specific example, if the data system 100 identifies a query 'ylp' and subsequent selection of a Yelp review application result in a plurality of fragments, the data system 100 may determine that entry of the query 'ylp' may favor selection of Yelp search results. In these cases, a search system and/or advertisement system may modify search result generation and/or advertisement selection based on the learned association between search query and application result selection in order to favor the specific learned association.

Figure 5:
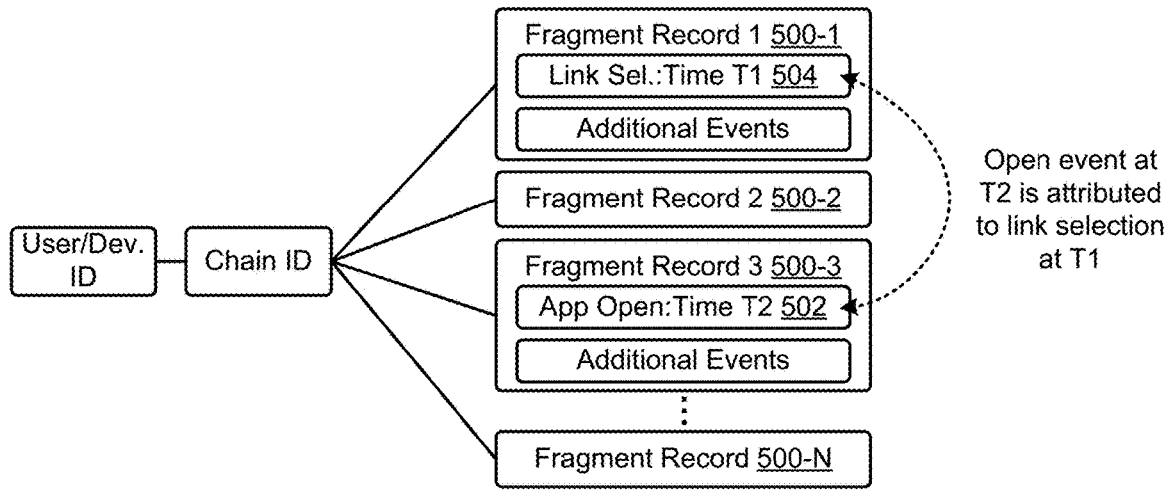
FIG. 5 illustrates an example set of fragment records in which one event in a later fragment record is attributed to a prior event in an earlier fragment record.

FIG. 5 illustrates an example set of fragment records 500-1, 500-2, . . . , 500-N in which one event 502 in a later fragment record 500-3 is attributed to a prior event 504 in an earlier fragment record 500-1. In FIG. 5, fragment record 1 500-1 includes a link selection event 504 at time T1. Additionally, in FIG. 5, fragment record 3 500-3 includes an application open event 502 at time T2, which occurs after time T1. In FIG. 5, the data system 100 (e.g., other data gen/update modules 208) may attribute the application open event 502 at time T2 to the link selection event 504 at time T1. As described herein, example attributions may include, but are not limited to: attribution of an application installation/open (e.g., app open event at T2) to selection of a web/application link (e.g., link selection event at T1), a commerce event (e.g., purchase or add to cart) on a website/application to a previously selected link, or any other sequence of events. In some implementations (e.g., deferred deep linking or other type of redirect), the application open event 502 at T2 may result in routing the user device to the application page associated with the link selected at time T1. In some implementations, an event may be attributed to multiple prior events.

In cases where later occurring events are associated with a new user/device ID, the data system 100 may match the later occurring events to existing user/device ID(s). For example, the data system 100 (e.g., other data gen/update modules 208) may include matching functionality that matches the events based on a variety of factors. Example matching factors may include, but are not limited to, matches between IP addresses, device OS name/versions, device types, screen resolutions, browser types, and/or other data.

In FIG. 5, the matching and attribution functionality matches and attributes events in different fragment records. Although matching and attribution is illustrated in FIG. 5 as being performed across different fragments, the data system 100 may also perform matching and attribution functions for events within the same fragment.

In some implementations, the data system 100 may generate additional attribution data that indicates attribution between events. For example, the data system 100 may annotate one or both events to indicate the attribution connection between the events. In the example scenario of FIG. 5, the data system 100 may annotate the app open event at T2 to indicate that it is attributed to the link selection event at time T1.

Figure 6:
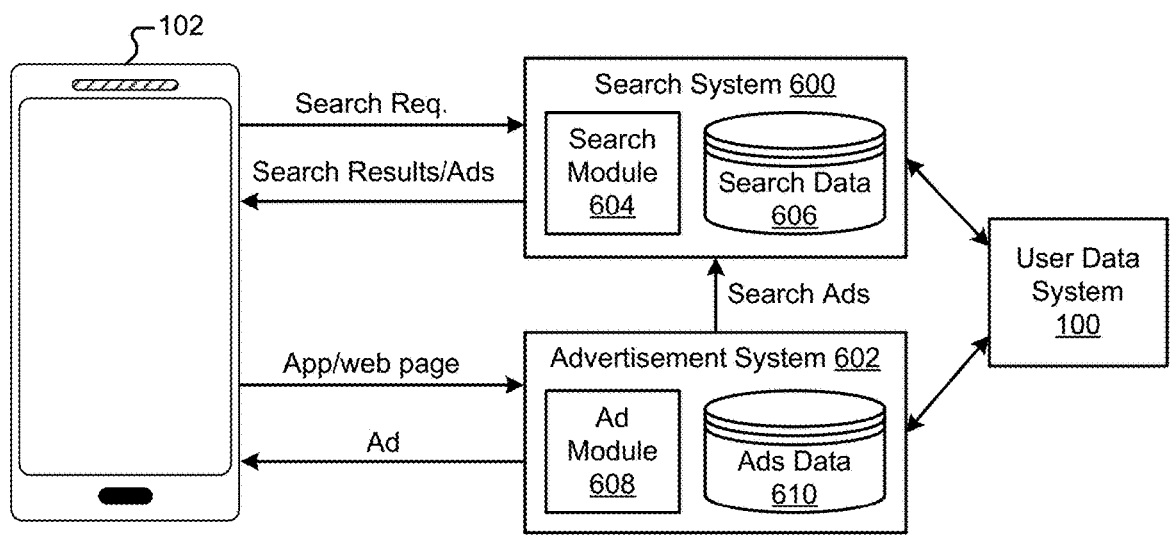
FIG. 6 illustrates an example search system and advertisement system that may provide search functionality and advertisement functionality based on data acquired from the user data system.

FIG. 6 illustrates an example search system 600 and advertisement system 602 that may provide search functionality and advertisement functionality based on data acquired from the data system 100. The example search system 600 includes a search module 604 and search data 606 that provide the search functionality. For example, the search module 604 may receive a search request from a user device 102 and generate a search response (e.g., search results) based on the search request. The user device 102 may render a search GUI that may display user-selectable search results that may access web/application pages.

The search module 604 may generate search results based on a user search query and/or other data (e.g., user data, user context data, etc.) included in the search request. For example, the search module 604 may generate search results based on matches between the search query and search data.

The search data may include a variety of data structures used for search, such as lists, tables, one or more search indexes, etc.

The search data may include search/scoring data that the search module 604 may use to identify the search results. Search/scoring data may include a variety of types of data, such as an application description, application state description, keywords associated with the application, possible partial/complete queries associated with the application, and other data used to identify the application. The description data may include text/numbers that are associated with the application/state, such as text/numbers acquired (e.g., crawled/scraped) from the application state. In some implementations, the description data may include geolocation data, such as a postal address and/or geolocation coordinates (e.g., latitude/longitude). Example description data for an application state and/or webpage may also include a brief description of the entity associated with the application state (e.g., a business, movie, song, etc.), user reviews, rating numbers, and business hours.

The search/scoring data may include scoring/filtering data. The scoring/filtering data may include values that are used by the search module 604 to score the search results during search. Example scoring values may include, but are not limited to, popularity scores, review numbers, rating numbers, aggregate values (e.g., aggregate usage values), and application download numbers. Popularity scores may indicate the popularity of the application and/or the popularity of the application state. Aggregate usage values may include data indicating a number of times a plurality of users accessed the application state over a period of time (e.g., daily/monthly). The aggregate usage values may include aggregate values for different geolocations (e.g., cities, states, countries), languages, device types, operating systems, times of day, days of week, and other combinations of parameters.

In some implementations, the search/scoring data may include aggregate search/usage data associated with an application. The aggregate search/usage data may include data associated with search and application usage from a plurality of users. For example, the search data may include partial/complete search queries used by other users along with application links selected based on the queries. In a specific example, a search record for the Facebook application may include a partial query of "fb" based on queries or query sessions used to search for the Facebook application by a plurality of individuals. The aggregate search/usage data may also indicate how a plurality of users have used the application.

In some implementations, the search module 604 may personalize the search results (e.g., perform a personalized search). For example, the search module may personalize search results based on user data that indicates which applications are installed on the user device 102. The search module 604 may also personalize search results based on usage data for the installed applications. Usage data may indicate different user events associated with the applications, along with the time at which the events occurred. Example user events may include application installation, application uninstallation, reinstallation, application opens, application page views, and commerce events (e.g., adding to a shopping cart and/or completing a purchase).

The example advertisement system 602 includes an advertisement module 608 ("ad module 608") and advertisement data 610 that provide advertisement functionality. For example, the ad module 608 may receive an advertisement request and generate an advertisement response (e.g., advertisement results) based on the advertisement request. In FIG. 6, the advertisement system 602 may generate search result advertisements for inclusion in search results. The advertisement system 602 may also generate advertisements for web/application pages (e.g., banner advertisements).

The advertisement data 610 may include advertisement records generated by advertisers that interact with the advertisement system 602 (e.g., in an advertisement campaign interface). An advertisement record may include data associated with an advertisement, such as advertisement content (e.g., used to render the advertisement) and targeting parameters (e.g., used to select the advertisement). Example advertisement content may include text and/or images to be included in the displayed advertisement, such as app icons and images/text describing an application, application state, webpage, product, or service.

The ad module 608 may select one or more advertisements (e.g., for insertion into an application page, webpage, or search results) based on targeting parameters. The advertisers may specify targeting parameters for advertisements that, when satisfied, may result in the display of an advertisement. Example advertisement targeting parameters may include, but are not limited to, data associated with the search results, a user's context (e.g., geolocation, device type, OS, etc.), a user's historical web/application usage (e.g., as indicated by the data system 100), and/or the user's current partial/whole search query.

In some implementations, a targeting parameter may indicate one or more applications that should be present in search results to trigger the advertisement. In some implementations, a targeting parameter may indicate whether one or more applications should (or should not) be installed. For example, for a re-engagement advertisement, the application associated with the re-engagement advertisement should be installed. In some implementations, a targeting parameter may be based on application usage (e.g., user usage and/or aggregate usage), such as how often an application or similar applications are used, when an application was last used by the user, and the user's past engagement with categories of applications (e.g., where applications are associated with categories). In some implementations, a targeting parameter may include whether a specific application has been deleted or has never been deleted. In some implementations, a targeting parameter may include a popularity of the application (e.g., based on a number of downloads and/or aggregate usage). In some implementations, a targeting parameter for re-engagement may include an aggregate popularity of the application page to which the advertisement directs the user device.

In some implementations, an advertiser may also specify a bid price for an advertisement that indicates an amount the advertiser will pay for actions associated with the advertisement. For example, the bid price may be an amount for showing the advertisement, selecting the advertisement, and/or performing an action after selecting the advertisement (e.g., installing an application or making a purchase).

In some implementations, the ad module 608 may identify an initial set of advertisements based on targeting parameters. The ad module 608 may then select one or more final advertisements (e.g., for the search results) based on additional factors, such as an advertisement bid price and/or expected interaction with the advertisement (e.g., user selection, app installation, etc.) based on user data and/or aggregate data. In some implementations, the ad module 608 may score the initially identified set of advertisements and select the advertisement(s) with the highest score(s). The ad module 608 may score advertisements based on any of the advertising parameters described above (e.g., user usage and/or aggregate usage).

The data structures (e.g., fragment records, ID-fragment records, search records, and advertisement records) and data stores described herein are only example data structures and data stores. As such, the devices and systems described herein may implement the techniques of the present disclosure using additional/alternative data structures and data stores.

Modules and data stores included in the systems and devices represent features that may be included in the systems and devices of the present disclosure. The modules and data stores described herein may be embodied by electronic hardware, software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein may be realized by common electronic hardware and software components. In some implementations, the features associated with the one or more modules and data stores depicted herein may be realized by separate electronic hardware and software components.

The modules and data stores may be embodied by electronic hardware and software components including, but not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

The one or more processing units may include one or more central processing units (CPUs), graphics processing units (GPUs), digital signal processing units (DSPs), or other processing units. The one or more processing units may be configured to communicate with memory components and I/O components. For example, the one or more processing units may be configured to communicate with memory components and I/O components via the interconnect components.

A memory component (e.g., main memory and/or a storage device) may include any volatile or non-volatile media. For example, memory may include, but is not limited to, electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology (e.g., compact disc, digital versatile disc, and/or Blu-ray Disc), or any other memory components.

Memory components may include (e.g., store) data described herein. For example, the memory components may include the data included in the data stores. Memory components may also include instructions that may be executed by one or more processing units. For example, memory may include computer-readable instructions that, when executed by one or more processing units, cause the one or more processing units to perform the various functions attributed to the modules and data stores described herein.

The I/O components may refer to electronic hardware and software that provides communication with a variety of different devices. For example, the I/O components may provide communication between other devices and the one or more processing units and memory components. In some examples, the I/O components may be configured to communicate with a computer network. For example, the I/O components may be configured to exchange data over a computer network using a variety of different physical connections, wireless connections, and protocols. The I/O components may include, but are not limited to, network interface components (e.g., a network interface controller), repeaters, network bridges, network switches, routers, and firewalls. In some examples, the I/O components may include hardware and software that is configured to communicate with various human interface devices, including, but not limited to, display screens, keyboards, pointer devices (e.g., a mouse), touchscreens, speakers, and microphones. In some examples, the I/O components may include hardware and software that is configured to communicate with additional devices, such as external memory (e.g., external HDDs).

In some implementations, systems may include one or more computing devices that are configured to implement the techniques described herein. Put another way, the features attributed to the modules and data stores described herein may be implemented by one or more computing devices. Each of the one or more computing devices may include any combination of electronic hardware, software, and/or firmware described above. For example, each of the one or more computing devices may include any combination of processing units, memory components, I/O components, and interconnect components described above. The one or more computing devices of the systems may also include various human interface devices, including, but not limited to, display screens, keyboards, pointing devices (e.g., a mouse), touchscreens, speakers, and microphones. The computing devices may also be configured to communicate with additional devices, such as external memory (e.g., external HDDs).

The one or more computing devices of the systems may be configured to communicate with the network 110. The one or more computing devices of the systems may also be configured to communicate with one another (e.g., via a computer network). In some examples, the one or more computing devices of the systems may include one or more server computing devices configured to communicate with user devices. The one or more computing devices may reside within a single machine at a single geographic location in some examples. In other examples, the one or more computing devices may reside within multiple machines at a single geographic location. In still other examples, the one or more computing devices of the systems may be distributed across a number of geographic locations.

What is claimed is:

1. A method comprising:
    sequentially generating, at a server, a plurality of fragment records for a user device according to fragment generation rules, wherein the fragment generation rules specify that each subsequent fragment record be generated for user device events that occur within a defined period of time, wherein each fragment record includes event data from the user device for a series of user device events associated with actions taken on the user device, and wherein each fragment record includes a fragment identifier (ID) that uniquely identifies the fragment record and was generated using a non-deterministic ID generation algorithm;
    generating, at the server, an ID-fragment record that associates a chain ID with the plurality of fragment IDs, wherein the chain ID is associated with one or more device IDs that identify the user device;
    removing, at the server, associations between the chain ID and fragment IDs according to removal parameters indicating that associations between the chain ID and fragment IDs be removed based on an age of the fragment records; and
    generating, at the server, at least one of search results and advertisements for the user device based on the event data included in the fragment records that remain associated with the chain ID after removing associations between the chain ID and some fragment IDs.

2. The method of claim 1, wherein the fragment IDs are not associable back to the chain ID after removal of the associations between the chain ID and the fragment IDs.

3. The method of claim 2, wherein the fragment IDs are not associable with one another after removal of the associations between the chain ID and the fragment IDs.

4. The method of claim 3, further comprising:
    determining aggregate event data values using event data from fragment records including fragment IDs that have been disassociated from the chain ID; and
    generating at least one of search results and advertisements for the user device based on the aggregate event data values.

5. The method of claim 1, wherein each fragment record does not include device IDs and does not include data that is generated based on the device IDs.

6. The method of claim 1, wherein the non-deterministic ID generation algorithm includes a random ID generation algorithm.

7. The method of claim 1, further comprising generating the chain ID using a random ID generation algorithm.

8. The method of claim 1, wherein the event data includes at least one of web event data and application event data, wherein the web event data is associated with user actions in a web browser application, and wherein the application event data is associated with user actions in one or more applications on the user device in addition to the web browser application.

9. The method of claim 8, wherein the fragment generation rules specify that each subsequent fragment record be generated for user device events based on whether the event data is web event data or application event data.

10. The method of claim 1, wherein the fragment generation rules specify an amount of content to be included in each of the fragment records.

11. The method of claim 1, further comprising removing associations between the chain ID and the fragment IDs based on the content of the fragment records.

12. A method comprising:
    sequentially generating, at a server, a plurality of fragment records for a user device according to fragment generation rules, wherein the fragment generation rules specify that each subsequent fragment record be generated for user device events that occur within a defined period of time, wherein each fragment record includes event data from the user device for a series of user device events associated with actions taken on the user device, and wherein each fragment record includes a fragment identifier (ID) that uniquely identifies the fragment record and was generated using a non-deterministic ID generation algorithm;

generating, at the server, an ID-fragment record that associates a chain ID with the plurality of fragment IDs, wherein the chain ID is associated with one or more device IDs that identify the user device;

removing, at the server, associations between the chain ID and fragment IDs according to removal parameters indicating that associations between the chain ID and fragment IDs be removed based on an age of the fragment records;

attributing, at the server, a recent user device event in a first fragment record to a prior user device event in a second fragment record; and in response to attributing the recent user device event to the prior user device event, sending, from the server, routing data to the user device configured to access an application page.

13. The method of claim 12, wherein the prior user device event was a selection of a link to the application page.

14. The method of claim 12, wherein the fragment IDs are not associable back to the chain ID after removal of the associations between the chain ID and the fragment IDs.

15. The method of claim 14, wherein the fragment IDs are not associable with one another after removal of the associations between the chain ID and the fragment IDs.

16. The method of claim 12, wherein each fragment record does not include device IDs and does not include data that is generated based on the device IDs.

17. The method of claim 12, wherein the non-deterministic ID generation algorithm includes a random ID generation algorithm.

18. The method of claim 12, further comprising generating the chain ID using a random ID generation algorithm.

19. The method of claim 12, wherein the event data includes at least one of web event data and application event data, wherein the web event data is associated with user actions in a web browser application, and wherein the application event data is associated with user actions in one or more applications on the user device in addition to the web browser application.

20. The method of claim 19, wherein the fragment generation rules specify that each subsequent fragment record be generated for user device events based on whether the event data is web event data or application event data.

21. The method of claim 12, wherein the fragment generation rules specify an amount of content to be included in each of the fragment records.

22. The method of claim 12, further comprising removing associations between the chain ID and the fragment IDs based on the content of the fragment records.

* * * * *